(12) United States Patent
Kuzkin et al.

(10) Patent No.: US 8,805,947 B1
(45) Date of Patent: *Aug. 12, 2014

(54) METHOD AND SYSTEM FOR REMOTE DEVICE ACCESS IN VIRTUAL ENVIRONMENT

(75) Inventors: Maxim A. Kuzkin, Moscow (RU); Alexander G. Tormasov, Moscow (RU)

(73) Assignee: Parallels IP Holdings GmbH, Schaffhausen (CH)

( * ) Notice: Subject to any disclaimer, the term of this patent is extended or adjusted under 35 U.S.C. 154(b) by 10 days.

This patent is subject to a terminal disclaimer.

(21) Appl. No.: 13/174,500

(22) Filed: Jun. 30, 2011

Related U.S. Application Data

(63) Continuation-in-part of application No. 12/393,000, filed on Feb. 25, 2009, now Pat. No. 7,975,017.

(60) Provisional application No. 61/031,932, filed on Feb. 27, 2008.

(51) Int. Cl.
*G06F 15/177* (2006.01)
(52) U.S. Cl.
USPC .......................................... 709/208; 709/226

(58) Field of Classification Search
USPC ......... 709/208, 209–211, 217–219, 223–226; 718/1, 100–108
See application file for complete search history.

(56) References Cited

U.S. PATENT DOCUMENTS

| 7,685,635 B2 * | 3/2010 | Vega et al. ...................... 726/17 |
| 7,975,017 B1 * | 7/2011 | Kuzkin et al. ................. 709/208 |
| 2006/0107269 A1 * | 5/2006 | Bantz et al. .................... 719/310 |
| 2007/0204153 A1 * | 8/2007 | Tome et al. .................... 713/164 |

* cited by examiner

*Primary Examiner* — Ruolei Zong
(74) *Attorney, Agent, or Firm* — Bardmesser Law Group

(57) ABSTRACT

A method, system and computer program product for accessing remote devices is provided. The proposed method allows users to remotely access devices or tools controlled by a Virtual Environment (VE) implemented on a remote server. A user of a client machine or a mobile communications device can access a remote device controlled by a server or by local client of the server. The server can have a number of VEs implemented on it. Each of the VE can run a Guest OS that has guest device drivers installed on it. The VE receives the user request and passes on user commands to a device controlled by the guest device driver installed on the Guest OS of the VE.

15 Claims, 6 Drawing Sheets

METHOD AND SYSTEM FOR REMOTE DEVICE ACCESS IN VIRTUAL ENVIRONMENT

CROSS-REFERENCE TO RELATED APPLICATION

This application is a continuation in part of U.S. patent application Ser. No. 12/393,000, filed on Feb. 25, 2009, entitled METHOD AND SYSTEM FOR REMOTE DEVICE ACCESS IN VIRTUAL ENVIRONMENT, which is a non-provisional of U.S. Provisional Patent Application No. 61/031,932 filed on 27 Feb. 2008, entitled METHOD AND SYSTEM FOR REMOTE DEVICE ACCESS, which are incorporated by reference herein in their entirety.

BACKGROUND OF THE INVENTION

1. Field of the Invention

The present invention relates generally to Virtual Machine (VM) technology and, more particularly, to a method and system for accessing remote devices using a VM.

2. Background Art

In the past decade, capabilities of computer systems have increased significantly. Computer systems process large volumes of data, which is changed or updated constantly. Even well-known and widely distributed applications are upgraded very often, so consumers have to download new software remotely.

One conventional approach that allows users to have access to files and applications residing on a remote system is so-called "dumb terminal" that is connected to a large central computer or a computer cluster. The applications are only installed on the central computer, and users run the applications remotely. The user can control the application through a GUI of the local display, while no application executable code is loaded onto the user's computer. The "dumb terminal" approach has two major shortcomings. One is security, since the user has to pass data to the central computer system. Another one is that a user is limited to applications installed on the central computer system.

Another way for a user to remotely access software and data is to download the entire desired application from a provider, which generally involves loading files from a physical storage medium such as a CD ROM. This approach is inconvenient for users who only need to use a particular feature of the application, or only need it for a short time. Another disadvantage of this approach is that the downloaded applications occupy large amounts of memory available on the user's system. Downloading of applications also presents a problem of unauthorized copying.

The problem of accessing and running, by a user, a potentially arbitrarily large number of applications (i.e., executable files) remotely is addressed in the U.S. Pat. No. 6,735,601. The system disclosed in this patent allows a user to retain local control of the execution of the applications installed or stored remotely. The proposed system is intended for situations when a user chooses not to load the application onto his computer. No scaling down or other modifications of the software applications are required. The proposed system, however, does not allow users to access devices controlled by the remote server or by a local client of the remote server.

The industry trend of virtualization and isolation of computer system resources makes the task of remote access, and in particularly remote device access, more complex. A Virtual Machine (VM) is a type of an isolated Virtual Execution Environment that runs on the same physical machine simultaneously. Each VM instance executes its own OS kernel. Support of Virtual Machines is implemented using a Virtual Machine Monitor and/or a Hypervisor.

Virtualization allows running a number of VMs on the same physical machine or server. Each VM can have a Guest Operating System (GOS) implemented on it. A GOS can support a number of Guest tools and devices. A remote access to these tools and devices by a user of a remote computer system is critical. None of the conventional remote access systems provide an efficient mechanism for remote access to devices in a Virtual Execution Environment.

Accordingly, there is a need for a system and a method for accessing remote devices using a Virtual Execution Environment.

SUMMARY OF THE INVENTION

The present invention is directed to method, system and computer program product for accessing remote devices. The proposed method allows users to remotely access devices or tools controlled by a Virtual Execution Environment (VEE), such as a VM, implemented on a remote server. The process executed on remote server may be based on Parallels™ virtualization techniques, e.g. on Parallels Desktop, Parallels Workstation, Parallels Server and Parallels Virtuozzo Containers, although the invention is not limited to any particular virtualization technology. These are examples of virtualized servers used for implementing the proposed method.

According to the proposed method, a user of a client machine (i.e., a desktop or a laptop) can access a remote device controlled by a server or a local client of the server. The server can have a number of Virtual Machines (VMs) implemented on it. Each of the VMs can run a Guest OS that has Guest device drivers installed on it. In one embodiment, a special Dispatcher module called Parallels Server runs on the physical server. The Parallels Server receives remote access requests from a user of a client machine and dispatches these requests to the VMs that run on the physical server. The VM receives the user request and passes on user commands to a device controlled by the guest device driver. In an exemplary embodiment, a user can remotely access some third party Guest Tools controlled by a Guest API Library of a GOS.

Therefore, a user of a client machine can, advantageously, access and control devices that are not physically connected to the client machine. A number of remote users can benefit from using the same device without having to install drivers for these devices on the client machines.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
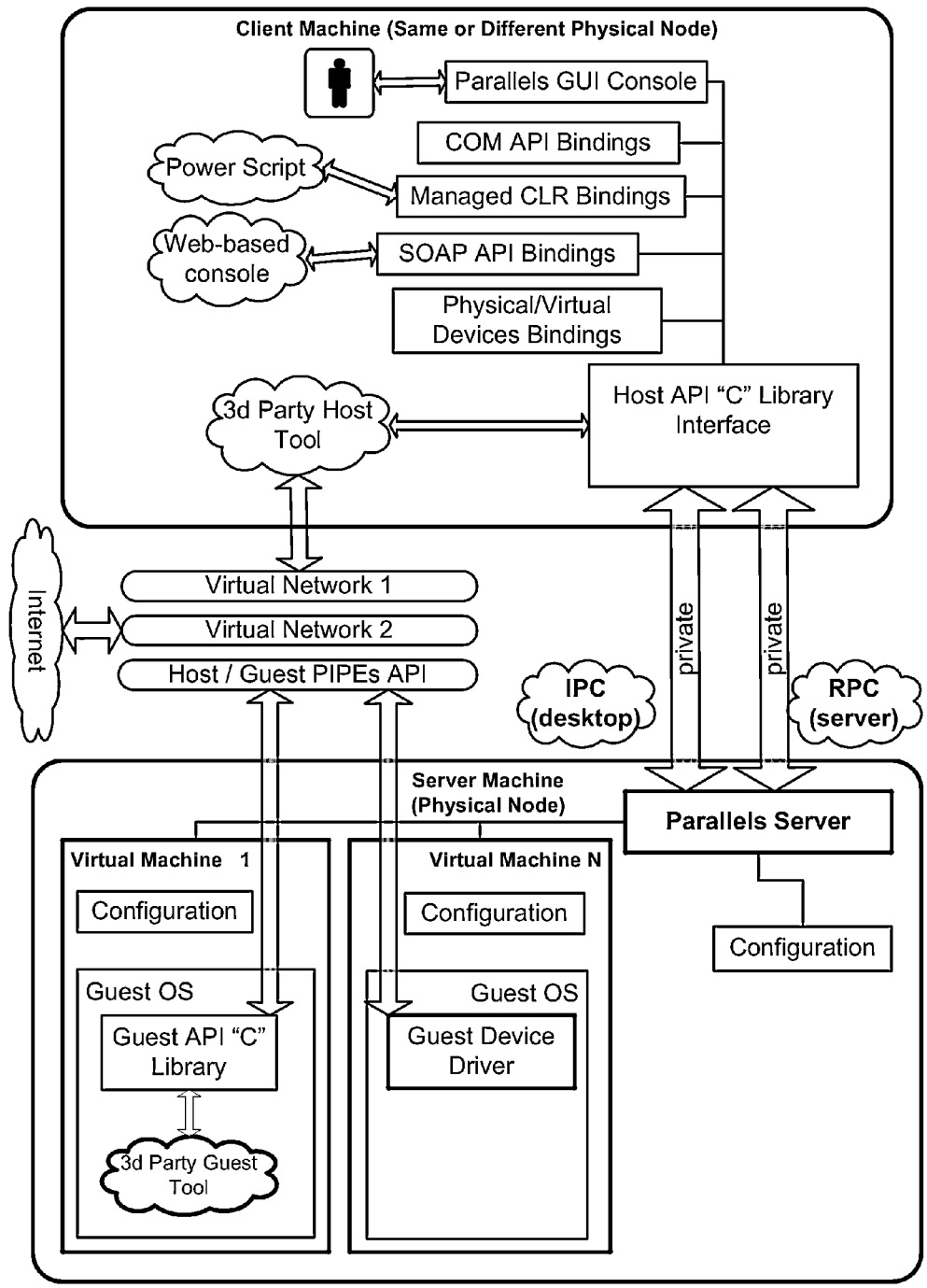
FIG. 1 illustrates a system architecture, in accordance with an exemplary embodiment.

Reference will now be made in detail to the embodiments of the present invention, examples of which are illustrated in the accompanying drawings.

The present invention is directed to a method, system and computer program product for accessing remote devices using Virtual Environment. The proposed method allows users to remotely access devices or tools controlled by a VM implemented on a remote server.

A VM is implemented on a server connected to a number of client computers. The client computers have external devices such as CD ROMs, DVD players, high definition video cards, USB flash cards, USB smart cards, sound/video cards, external hard drives, DMA (direct memory access) devices, VT-C, VT-d and VT-x processors, etc. Note that most servers do not have sound capability (since there is no point in having sound on a server), but a VM launched on the server can access a sound card on a local machine, as well as other peripherals on the same or different machine. A special secure communication channel (e.g., IP SEC protocol) is established between the VM and the client computers. The VM accesses the remote devices attached to the remote clients. Note that each client can have a combination of the above listed devices attached to it. According to an exemplary embodiment, the server-based VM can access any number of the remote devices of a single remote client or of a plurality of clients. In effect, it is possible to assemble a virtual (distributed) computer with peripherals that are physically located on several different computers, and which are controlled through VM technology running on a server from a client-side through server-based secure communications protocol. Other devices can include video changers, video-on-demand players, CPUs, math coprocessors, vector processors, disk drives, etc.

Data exchange between the VM and the client devices can be optimized. For example some data can be compressed or pre-processed on the client site. Also, the device-related commands that are not needed by the VM are not sent over the communication channel. Thus, an intelligent secure communication channel is established between the VM and the remote client devices (optionally using encryption to connect some or all of the hardware to the VM).

According to the proposed system and method, a client-server infrastructure is provided. A user of a client machine (i.e., a desktop or a laptop) can access remote devices connected to a server or to local clients of the server. The server can have one or multiple Virtual Machines (VMs) running on it. Each of the VMs can run a Guest OS that has guest device drivers installed on it. In one embodiment, a special application called Parallels Server, available from Parallels Software International, Inc., runs on the physical server.

The Parallels Server receives internal (i.e., private) access requests from a user of a client machine and dispatches these requests to the VMs that run on the physical server. The VM receives the user request and passes on user commands to a device controlled by the guest device driver installed on the GOS of this VM. In one embodiment, a user can remotely access some third party guest tools controlled by a Guest API Library of a GOS.

According to the preferred embodiment, a user of a client machine can remotely (i.e., via a VM) access and control devices that are not physically connected to the client machine. A number of remote users can benefit from using the same device. Note that no device drivers need to be installed on the clients. Furthermore, each driver has to be installed only once on one of the VM's GOS.

The architecture of an exemplary client-server system is illustrated in FIG. 1. A client machine has a proprietary Parallels GUI console implemented on it. The GUI console provides the user with a capability of access to remote devices and tools. A user can control remote devices by sending the commands to these devices using the GUI console. The client machine provides Component Object Model (COM) API binding.

It also manages a CLR (Common Language Runtime) binding (see http://en.wikipedia.org/wiki/Common_Language_Runtime), exposing interfaces to a scripting interfaces. A web-based console of the client machine provides Simple Object Access Protocol (SOAP) API binding. Note that SOAP API binding is implemented using XML and is OS-independent. The client machine also includes a physical/virtual device binding.

All of the binding implemented on the client machine use a client "C" Host API Library. According to the preferred embodiment, all client machines are based on a Host API "C" Library interface. The Host API "C" Library interface is a lowest level cross-platform interface, which allows the client machine(s) to interact with the VMs running on the physical server. As one embodiment, the Host API "C" Library interface is described, although other interfaces and programming languages supported by calling API functions may be used here (e.g., C++, Visual Basic, Pascal, assembly language, C#, etc.).

The Host API "C" Library cross-platform interface can interact with the VMs on the server in two different ways. In one embodiment, the Host API "C" Library cross-platform interface uses third-party host tools implemented on the client machine. Communication with the server's VMs is provided over one or several virtual networks. One of these virtual networks can utilize the Internet. In this embodiment the VM's are accessed directly using Host/Guest PIPE API (see http://msdn2.microsoft.com/en-us/library/aa365137 (VS.85). aspx).

In one embodiment, this network API can be implemented as a duplex pipe for corresponding data transmission between the physical machine and the client machine. In the case of Named Pipe, any process of the physical machine or the client machine can read data from a pipe and write data to the pipe. However, the pipe may be opened only either for reading or for writing. Therefore, the process that initiated the pipe chooses either a read mode or a write mode, and the pipe will remain open in this mode until it is closed.

Each of the VMs has a GOS installed on it. Note that, although in this example only two VMs are shown, an arbitrary number of the VMs can be implemented on the physical server. Both of the VMs are configured according to their own configuration parameters. In one embodiment, there is a Guest API "C" Library (i.e., guest client API Library) implemented on the GOS of VM 1. The Guest API "C" Library interface controls third-party guest tools. Thus, the user of the client machine can pass commands for controlling the third-party guest tools through the Host API "C" interface via the Guest API "C" interface implemented on the GOS of the VM.

In another embodiment, VM N has a guest device driver installed on the GOS of the VM N. Note that multiple guest device drivers can be installed on the GOS of the VM N. These guest device drivers can also be controlled by the user of the client machine remotely with the Host API "C" interface that sends the commands to the guest device drivers through the Virtual Networks using Host/Guest PIPEs API. Thus, the user of the client machine can access and control remote devices using the device drivers of the respective VMs running on the server.

In another embodiment, the Host API "C" Library interface of the client machine communicates with the Parallels Server installed on the same physical server where the VMs are implemented. The Parallels Server is configured in such a way that it can process and dispatch the private requests received from the Host API "C" interface of the client machine to the VMs.

The remote procedure call, or more generally, a remote function call, can utilize a host interface associated with managed languages, such as C, C++, C-Sharp, Java, other languages in the C-Sharp model, etc. Typically, software written in a managed language is compiled into byte code, and the byte code is then compiled into the object code. Such languages frequently have interfaces or APIs that permit other software, written in other languages, to use the APIs. The interface can be used with scripts, command lines, etc.

The configuration of the virtual machine, or virtual server, or virtual environment (VE), such as a Parallels Virtuozzo Container or Sun Container, can include both dynamic and static parameters. Static parameters can include such things as the number of CPUs, devices, total amount of memory, etc. Dynamic parameters can include the priority of the virtual machine, CPU or resources allocated to that virtual machine, etc. A configuration of the virtual machine can also include the operating system, virtual version of the operating system, a link to the location where the distributive of the virtual machine is stored, etc. In particular case, the VM or group of containers or VEs may be implemented as an environment for mobile application execution (e.g., Java midlets, Android application or the like). Specific settings, e.g., drivers settings may correspond to the type of the mobile device. As an example, sandboxes may contain driver specific for the mobile device.

Additionally, the RPC framework discussed above can be viewed in broader terms, and not just in the context of Microsoft RPC framework (for example, such as used in the COM/DCOM framework) or by Sun Microsystems.

Figure 5:
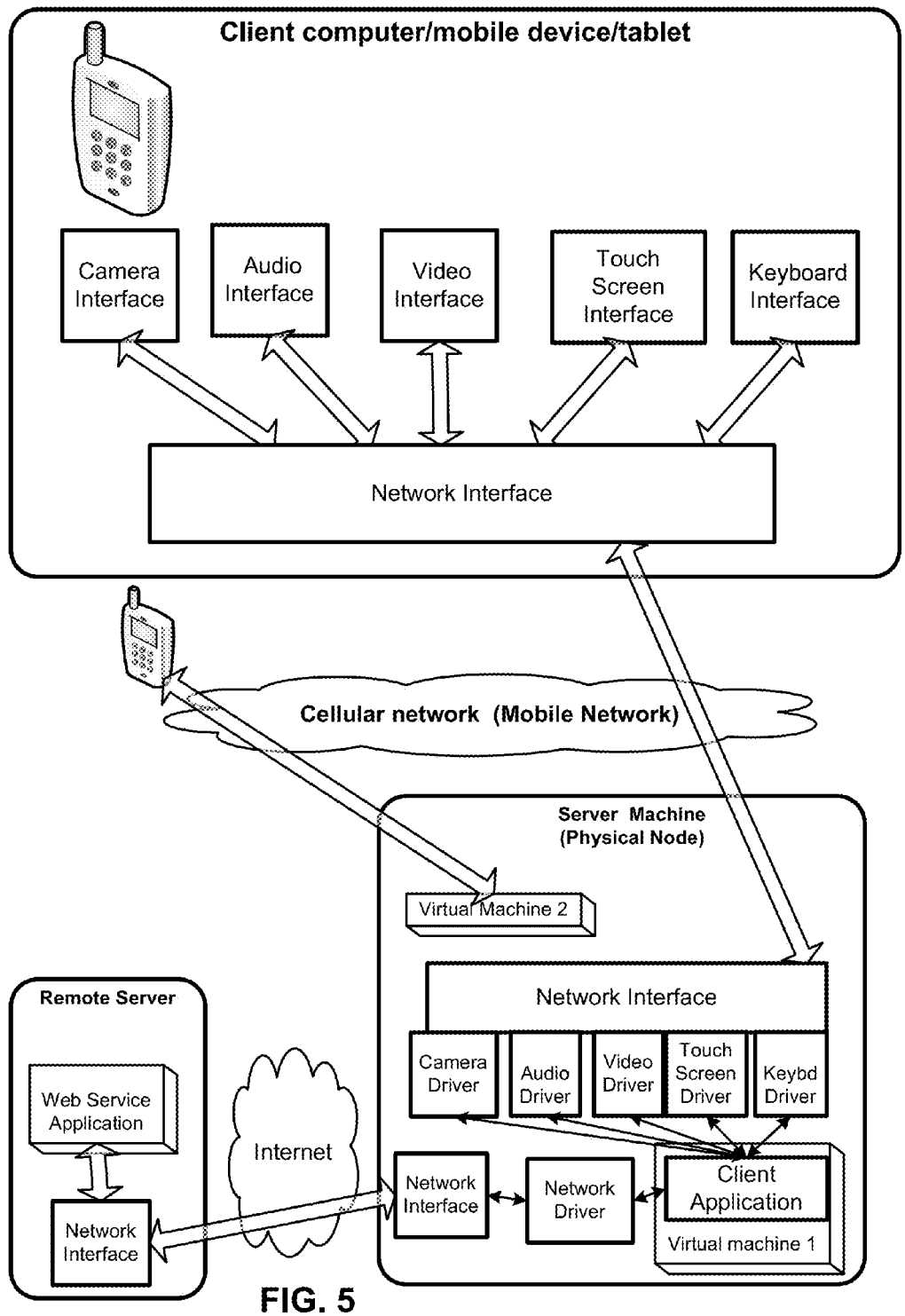
FIG. 5 illustrates an example of remote access system utilizing mobile devices, in accordance with the exemplary embodiment.

As yet another option, the virtual machine that runs on a server can interface to a mobile device, such as a smartphone or a tablet (iPod, Xoom, PlayBook, and similar types of devices). In this case, the peripheral devices may be attached to the Smartphone or tablet, or the peripheral device at issue may be part of the Smartphone or tablet itself—such as a touch screen, keyboard/virtual keyboard, memory, and so on. This is illustrated in FIG. 5. Note that two virtual machines (or, more generally, VEs) illustrate that multiple such VEs can run on the server, with similar VMs or containers corresponding to the similar corporate phones.

Figure 6:
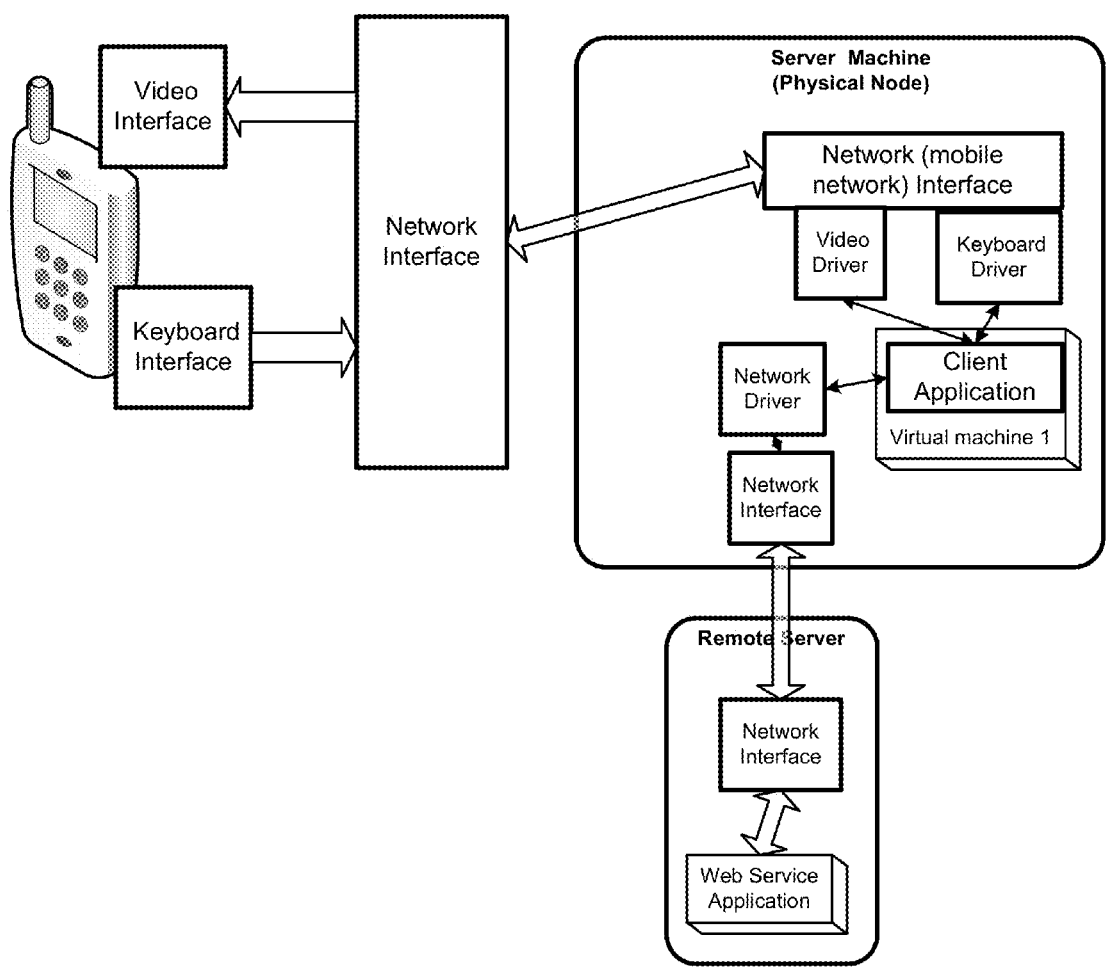
FIG. 6 illustrates data flow as implemented in one embodiment of the invention.

FIG. 6 illustrates how user of the mobile device uses the keyboard or touch screen, if any, or other input mechanism of the mobile device, to form a command for a client application. The command is transmitted over the mobile device-specific network to a corresponding network interface of the server and then, over the device driver, is translated to the client application executed inside VM1 of FIG. 5 as if it were the mobile device itself. If the application requests data from the wide area network, it may receive data through server machine network interface (a LAN card or a wireless network or the like). Results of the client application execution are transmitted to the mobile device in reverse order, e.g., to a video output element of the mobile device, and are presented to the user in the form of static or dynamic picture, sound, vibration alarm or the like. Video interface and display are shown in FIG. 6. As yet another option, such a mobile device can be used to access data in a secure manner. The data would be stored on the virtual machine, which is located on the server. The user has access to the data through his smartphone/tablet, however, if the Smartphone were stolen or lost, all that needs to be done is to disconnect that device from the virtual machine. Since no data is actually stored on the smartphone itself (unlike many conventional schemes, where data is actually stored on the smartphone, such as the Blackberry, using encryption), here, the data would not be compromised, since the only thing that the smartphone provides is the physical interface to access the data. From the virtual machine's perspective, the smartphone itself is no different than any other device, or the user interface (touch screen, etc.) is viewed as just another peripheral device.

As an example, starting of the client's application (client machine) is performed by actions of the client on the mobile device, e.g., by clicking on a link in the menu. Then, a request is sent to the remote client machine, specifically, but not necessary installed on the same machine as a sandbox, the request is handled by the client machine (for example, using a Java midlet or the like), and the result is sent to the display or other output port of the mobile device.

Installation of the application is performed in the same way. The user, e.g., in a browser (local or remote) chooses an application. Application pack (*.jar+*.jad or other package) is loaded and installed to the remote server. Preferably, the mobile device should not use a WAN, since the remote server can connect to the mobile network and to the wide area network as well. Also, the package may be stored locally and may be transmitted during the installation process to the distant server.

The private requests can come from an IPC (i.e., a desktop computer used as a client machine) or from an RPC (i.e., another server, connected to the client machine and using its Host API "C" interface). In both cases the Parallels Server passes on the commands to the VMs. Thus, the Parallels Server is executed as a router that passes commands from the Host API "C" interface of the client machine to the VMs running on the server machine. More specifically, remote device data interchange may be provided between either remote computing systems or between virtual machines running on the same hardware.

In case of the VM 1, the Parallels Server sends the commands to the Guest API "C" Library implemented on GOS of the VM 1. The Guest API "C" Library interfaces with the third party Guest tools. In case of the VM N, the Parallels Server sends the commands to the guest device driver installed on the GOS of the VM N. In both cases, the user of the client machine gains remote access and controls devices and tools connected to the server via the VMs 1-N running on this server.

Figure 2:
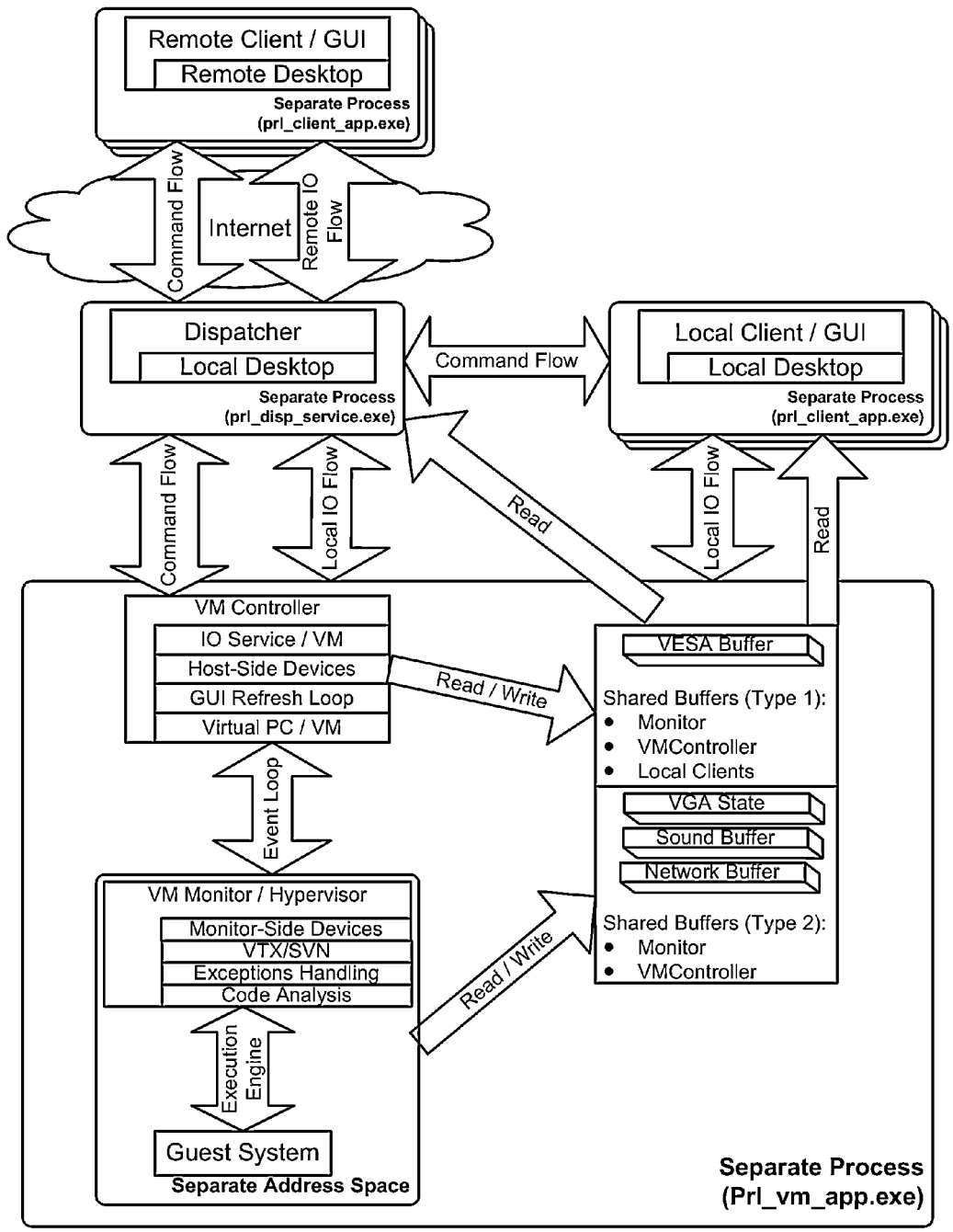
FIG. 2 illustrates a structure of communication protocols, in accordance with the exemplary embodiment.

As discusses above, the remote user controls the devices by passing the commands from a client machine to a server. A detailed structure of communication protocols used in the preferred embodiment is illustrated in FIG. 2. The essential communication protocols illustrated in FIG. 2 are Command Flow, I/O Flow, Event Loop and Execution Engine.

The commands are sent using the GUI at a remote desktop (i.e., client machine). The process prl_client_app.exe is executed on the client machine. The client machine is connected over the Internet to the Local Desktop that serves as a Dispatcher. The command flow is provided over the XML-based protocol (i.e., SOAP) over TCP connection. These commands are used to perform basic VM control operations. Most of these commands are implemented within the Source/CommandFlow that goes through an external port.

In one embodiment, the Remote IO Flow is a data-based protocol over a UDP connection. This flow is used to transfer raw VM data (i.e., video, sound, regular data, etc.). The Remote IO Flow also goes to the external port. The local desktop (i.e., dispatcher) executes its own process prl_disp_service.exe.

Two scenarios of remote control of the devices by the client are possible. In one scenario, also illustrated in FIG. 1, the devices and tools are connected to the server where the VMs are implemented. In another scenario, illustrated in FIG. 2, the local clients have devices connected to them. These local clients have guest device drivers installed on the GOSs of the VMs implemented on the server.

The use of the remote client can control the devices connected to the local clients by sending the commands to the VM's implemented on the remote server. This novel approach allows the remote users to access any devices on the network provided that the guest device drivers are installed on the GOS of the VMs.

One of ordinary skill in the art will appreciate that, in the preferred embodiment, the remote access is implemented at the device level, and that a remote user controls tools and devices connected to the server while no device drivers need to be installed on the client machine.

In the first scenario, the Dispatcher passes the command flow directly to the VM on the server. Then VMController communicates with VM Monitor (VMM) and the commands are passed to the guest driver of the GOS.

In the second scenario, the command flow is re-directed to another local client, where a local client GUI is implemented and a separate process prl_client_app.exe is executed. The Local IO Flow is directed to the VM. The Local IO Flow is FIFO (first-in, first-out) data transmission protocol that may be used to transfer Raw VM Data (i.e., video, sound, regular data, commands etc. generated on an external data bus of a hardware device).

The Local IO Flow is then transmitted using the Named Pipe or similar inter-process communication technique (see http://en.wikipedia.org/wiki/Named_pipe). The dispatcher also directs the Command Flow and Local IO Flow from the local server to the VM. Thus, the user of the remote client can send the commands all the way through to the devices connected to the local client. The VM Controller includes host-side devices, GUI Refresh Loop, IO Services for the VM and the Virtual Machine interface.

The Event Loop transfers the data between VM Monitor and VM events handler. The VM monitor (VMM) and Hypervisor can also include devices controlled on the monitor side, VTX/SVM supported features (AMD-V, see http://multi-core.amd.com/us-en/AMD-Multi-Core/Quad-Core-Advantage/At-Work-AMDOpteron/Virtualization.aspx, which is an AMD Virtualization™ technology that is a hardware-based technology that enables servers to reach higher levels of efficiency and utilization by assisting virtualization software to run multiple operating systems and applications on a single physical AMD Opteron™ processor-based server.).

Also, INTEL VT-X technology, see http://www.intel.com/technology/platform-technology/virtualization for IA-32 processors provides hardware support that simplifies processor virtualization, enabling reductions in virtual machine monitor (VMM) software size and complexity. The Resulting VMMs can support a wider range of legacy and future operating systems (OSs) on the same physical platform while maintaining high performance. Other such features include exception handling module and code analysis module. The VMM handles exceptions and interrupts. It also prepares guest context and sends requests to the Host handlers in the VM. The VMM interfaces with a Guest OS by means of an Execution Engine.

The VM controller can perform read/write operations with the shared buffers of a first type, such, as for example, VESA buffer. The VMM can perform read/write operations with the shared buffers of a second type, such as, for example, VGA State buffer, Sound buffer and Network buffer. The shared buffers of the first type are used to prevent copying of large data blocks between VMM/VMController and the clients.

The shared buffers of the second type are used to prevent copying of large blocks of data between the VMM and VMController. The Dispatcher and the local clients can only read data from the shared buffers. Note that, in one embodiment, the role of the Dispatcher can be performed by the Parallels Server. The communication protocols can be used with multiple remote clients as well as multiple local clients.

Figure 3:
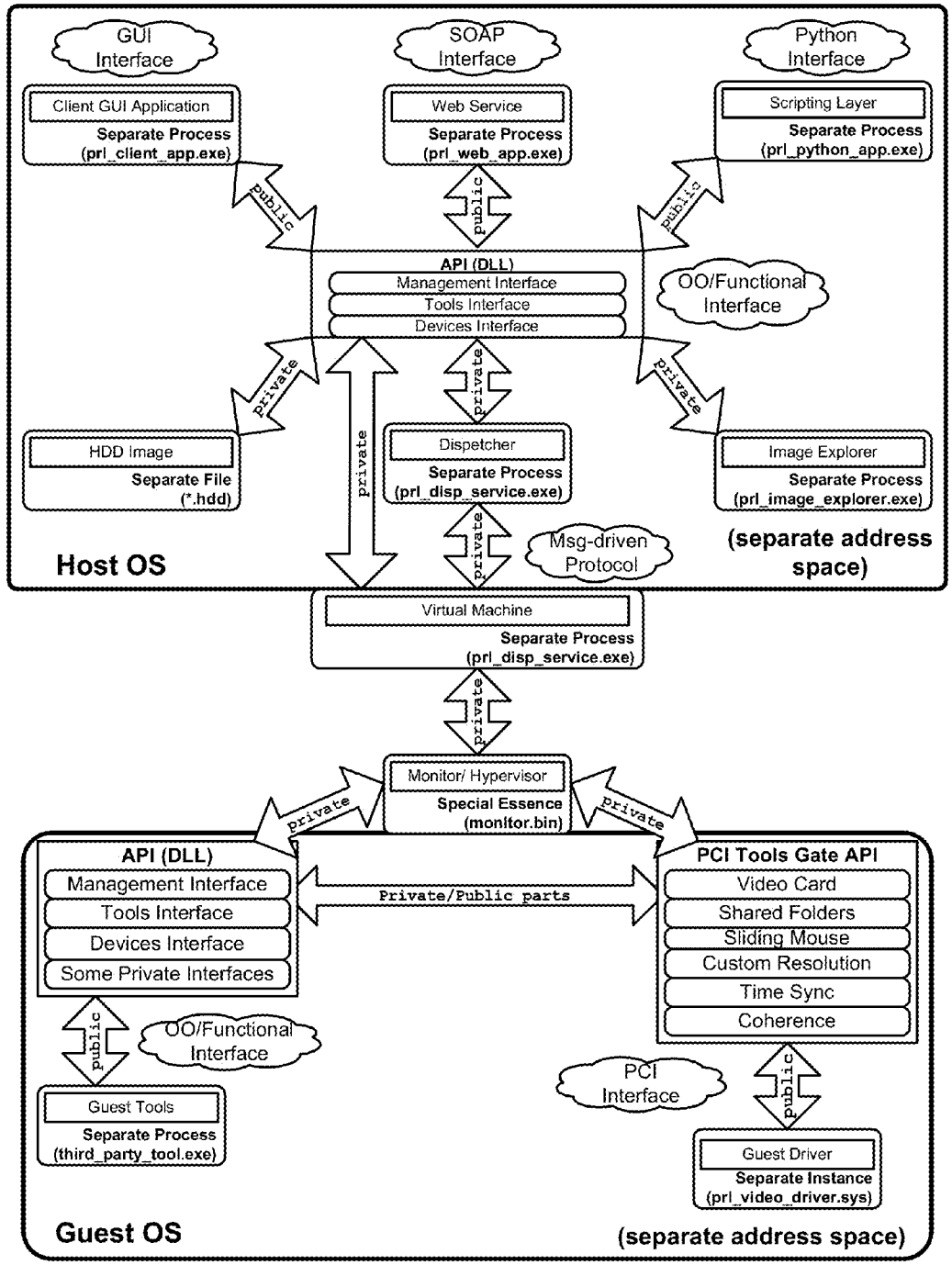
FIG. 3 illustrates an example of remote access system, in accordance with the exemplary embodiment.

FIG. 3 illustrates an exemplary remote access system. The system, according to the preferred embodiment, implements remote access to guest tools and guest devices. In the preferred embodiment, the remote access to guest tools and guest devices can be accomplished by different entities. A remote user can use the client GUI for accessing the devices as shown in FIG. 1.

A process prl_client_app.exe is executed using GUI interface. In another embodiment, a SOAP interface process prl_web_app.exe is executed and the remote devices can be controlled by a web service. In yet another embodiment, a Python interface process prl_python_app.exe is executed and the remote devices are controlled by a scripting layer. All of these interfaces can use interfaces provide by the lower level applications.

All of the above mentioned interfaces communicate with the API (DLL) module implemented as an object oriented (OO) functional interface. The communication between the interfaces is accomplished using public (i.e., external) protocols. The API (DLL) functional interface includes management interface, tools interface and device interface. The API (DLL) library exposes interfaces that enable any of the users of the GUI, SOAP or Python interfaces to implement any kind of a third party tools they want. Note that the API (DLL) library does not expose its interfaces to the users.

In one embodiment, the API (DLL) library can provide all the functionality for sending commands directly to the VM using internal (i.e. private) protocol. In another embodiment, addition functionality is needed. This functionality is provided by the Parallels Server (i.e., Dispatcher).

The prl_disp_service.exe is executed on a Dispatcher. Some information can be read from Hard Disk Drive (HDD) image and a process prl_image_explorer.exe is executed on the image explorer. These libraries expose all the functionality of a platform provided by the preferred embodiment. All of the communication protocols between these libraries and the API (DLL) libraries are private (i.e., internal). Note that all of the interfaces and the VMs are implemented on the host OS (i.e., in a separate address space).

The API (DLL) interface communicates with the VM using internal message-driven protocol as well. The separate process prl_disp_service.exe is executed on the VM. The same internal message-driven protocol is used between the VM and the VMM. The VMM using a Hypervisor can pass control commands to either a guest driver or a guest tool. In case of accessing a guest tool, the Host API (DLL) functionality is provided via OO/Functional interface.

The process third_party_tool.exe is executed by the guest tool module. In case of accessing the guest device driver, the PCI Tools Gate API (a communication protocol between host virtual machine and guest operating system sandbox based on the PCI bus reads and writes. The PCI Tools Gate API is described here by way of example only, and is not intended to limit the present invention.) is provided. Note that the PCI Tools Gate API is available on new platforms. The PCI Tools Gate API includes video card, shared folders, sliding mouse, custom resolution, time synchronization and coherence functionality.

Those skilled in the art that the VM, in accordance with the exemplary embodiment, allows users to access any of the remote devices attached to remote computers. Data exchange between the users and remote devices is implemented over secure intelligent channel. As noted earlier, if the sender and receiver both know a priori that some commands normally used as part of the protocol of the channel are not needed, then those commands can be dropped on the sender side, or their order can be rearranged, to optimize performance, or they can be grouped differently than the original grouping of commands. Also, if the memory or disk area being accessed is known to be about to be overwritten, there may be no point in transmitting the data involved (even though the hardware device itself may be unaware of this), or if there is no time to process the data (e.g., a video frame).

Figure 4:
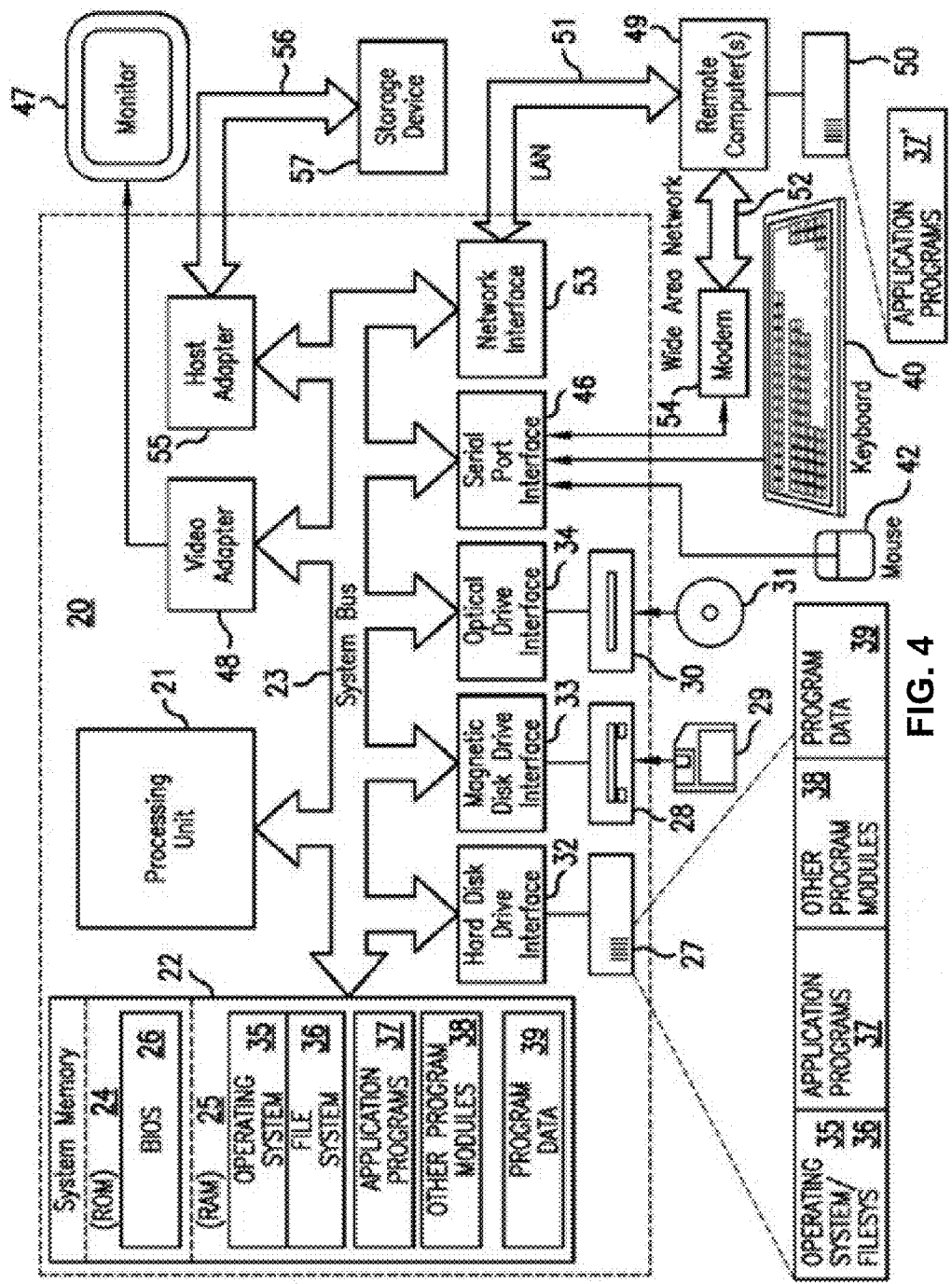
FIG. 4 illustrates an exemplary computer system on which the client and the server, according to exemplary embodiment, can be implemented.

With reference to FIG. 4, an exemplary system for implementing a client and a server according to the embodiments of the invention includes a general purpose computing device in the form of a computer or a server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25.

A basic input/output system 26 (BIOS), containing the basic routines that help to transfer information between elements within the computer 20, such as during start-up, is stored in ROM 24. The computer/server 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer/server 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows™ 2000). The computer 20 includes a file system 36 associated with or included within the operating system 35, such as the Windows NT™ File System (NTFS), one or more application programs 37, other program modules 38 and program data 39.

A user may enter commands and information into the computer/server 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the computer/server 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer/server 20 is connected to the local network 51 through a network interface or adapter 53. When used in a WAN networking environment, the computer/server 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer/server 20, or portions thereof, may be stored in the remote memory storage device.

It will be appreciated that the network connections shown are exemplary and other means of establishing a communications link between the computers may be used.

Having thus described the different embodiments of a system and method, it should be apparent to those skilled in the art that certain advantages of the described method and system have been achieved. In particular, it should be appreciated by those skilled in the art that system and method described in the preferred embodiment, provide for remote access that is implemented at the device level over a Virtual Environment (such as a VM), and that a remote user controls tools and devices connected to the server (or the local clients of the server) and no devices drivers need to be installed on the client machine.

It should also be appreciated that various modifications, adaptations, and alternative embodiments thereof may be made within the scope and spirit of the present invention. The invention is further defined by the following claims.

What is claimed is:

1. A method for remote device access, the method comprising:
   (a) establishing a mobile communication network connection between a mobile communications device and a server;
   (b) starting at least one Virtual Execution Environment (VEE) on the server, the VEE being controlled by a top level operating system;
   (c) installing at least one mobile communications device driver on the VEE for interfacing, over the network connection, and using a remote function call, to the mobile communications device through the mobile communications network;
   (d) activating a dispatcher module on the server, the dispatcher module being configured to receive remote access requests from a client machine and dispatches these requests to the VEEs and vice versa;
   (e) sending a command from the mobile communications device to the dispatcher module;
   (f) processing the command at the dispatcher module and passing it to a guest device driver of the VEE; and
   (g) receiving the command at the guest device driver and accessing the client machine over a remote function call protocol;
   wherein the interface from the mobile communication device to the dispatcher module is a managed language Application Programming Interface (API).

2. The method of claim 1, where a remote peripheral device of the client machine being accessed using the command is any of:
   a CD ROM;
   an external hard drive;
   a sound card;
   a video card;
   a USB flash drive;
   a memory card;
   a touchscreen;
   a keyboard;
   a virtual keyboard; and
   a USB smart card.

3. The method of claim 1, wherein a plurality of remote peripheral devices is connected to the server.

4. The method of claim 1, wherein a third-party guest tool is installed on the VEE.

5. The method of claim 4, wherein the dispatcher passes the control command to the third party guest tool.

6. The method of claim 1, wherein a plurality of the remote clients and a plurality of the local clients are connected to the server, and wherein the remote clients access the devices connected to the local clients.

7. The method of claim 6, wherein the clients are connected to the server via a protected intelligent channel.

8. The method of claim 1, wherein the VE is a Virtual Machine.

9. The method of claim 1, wherein the VE is a Parallels Container that virtualizes the top level operating system of the server.

10. The method of claim 1, wherein a user application of the mobile communications device is running in the VE on the server and a hardware interface of the mobile communications device is used to generate commands for the user application.

11. The method of claim 1, wherein a user application of the mobile communications device is running in a sandbox on the server and a hardware interface of the mobile communications device is used to generate commands for the user application.

12. The method of claim 1, wherein the control commands are sent from any of:
   a GUI interface;
   a SOAP interface; and
   a Python interface.

13. A system for remote device access, the system comprising:
   a processor;
   a memory coupled to the processor; and
   a computer code loaded into the memory and executed on the processor for implementing the steps of claim 1.

14. A system for remote device access, the system comprising:
   at least one mobile communications device connected to a server computer over a cellular network;
   at least one Virtual Machine (VM) activated on the server;
   a GOS running in the VM;
   at least one guest device driver installed on the GOS for interfacing, over the network connection, and using a managed language remote function interface protocol, to a peripheral remote device that is physically connected to the mobile communications device;
   the peripheral remote device connected to the server over the network;
   at least one dispatcher module implemented on the server, wherein the dispatcher module passes control commands sent from the mobile communications device on to the VM and manages a configuration of the VM; and
   wherein the control command is received at the guest device driver and the peripheral remote device is accessed over the remote function call protocol, wherein the control command is sent and received jointly with local data flow.

15. The system of claim 14, wherein the remote peripheral device is any of:
   a memory card;
   a touchscreen;
   a keyboard;
   a virtual keyboard; and
   a USB smart card.

* * * * *